(No Model.)
J. D. WILKENS.
DENTAL HANDPIECE.
No. 533,574. Patented Feb. 5, 1895.
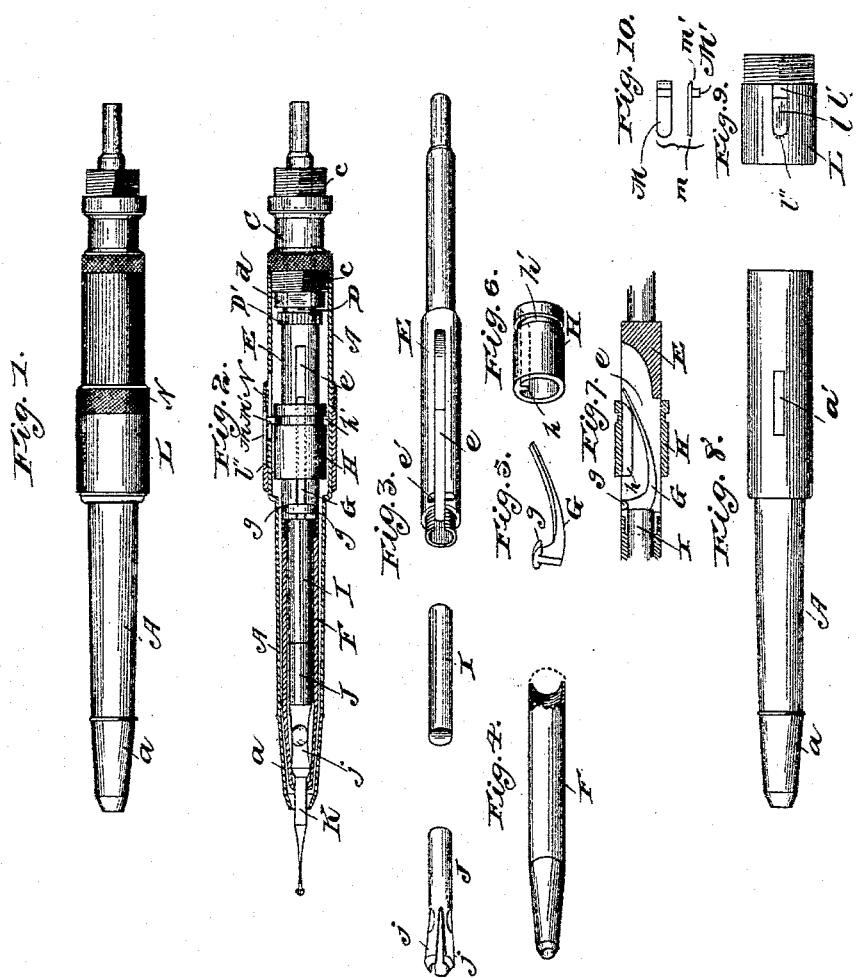

UNITED STATES PATENT OFFICE.

JOHN D. WILKENS, OF CHICAGO, ILLINOIS, ASSIGNOR TO JOHN N. CROUSE, OF SAME PLACE.

DENTAL HANDPIECE.

SPECIFICATION forming part of Letters Patent No. 533,574, dated February 5, 1895.

Application filed February 1, 1894. Serial No. 498,788. (No model.)

*To all whom it may concern:*

Be it known that I, JOHN D. WILKENS, of Chicago, Illinois, have invented certain new and useful Improvements in Dental Handpieces, of which the following is a specification.

My invention relates to certain improvements in hand pieces for dental engines; and it consists in certain features of construction of those parts which are manipulated to lock and release the tool.

In the accompanying drawings, Figure 1 is a view of the hand piece complete. Fig. 2 is a sectional view, partly in elevation, showing the tool in position to be withdrawn. Fig. 3 is a view showing separately and detached the chuck, the chuck actuating rod and the rear section of a divided spindle. Fig. 4 is a perspective view, partly broken away, of the forward section of the divided spindle. Fig. 5 is a perspective view of a cam lever. Fig. 6 is a similar view of an actuating collar for the cam lever. Fig. 7 is a sectional elevation of the connected ends of the spindle sections and the sliding collar for actuating the cam lever, the latter showing in side elevation. Fig. 8 is a detail plan view of the outside casing. Fig. 9 is a similar view of a sliding sleeve which works over the casing; and Fig. 10 shows in inverted plan and side elevation, respectively, a removable detent used in conjunction with the sliding sleeve.

The hand piece shown in the accompanying drawings belongs to that class wherein a tool driving spindle is revolubly mounted within a non-rotating casing or sheath, the spindle being adapted for connection at its rear end to a flexible shaft or other means for rotating it.

In the drawings, A represents an inclosing casing having the usual hard metal nose piece $a$ and an aperture $a'$ in the wall of the casing toward its rear end.

C represents a sheath collet having threaded ends, one of which threaded ends engages with the internal threads of the casing A, and the other of which engages with a coupling section (not shown). Within the collet C is an internal spindle collet D, having a jamb nut $d$.

E, (Fig. 3,) represents the rear section of a divided spindle which has its forward end externally threaded for engagement with the front spindle section F, (Fig. 4.) The spindle section E is longitudinally slotted, as at $e$, Figs. 2, 3 and 7, and this slot is bisected by a transverse depression $e'$, which forms a seat for the lugs of the cam lever G. This cam lever has a straight front face. Its lower side is curved, and the tail piece of the lever extends to about the plane of the lugs $g$, which is coincident with that of the opening of the slot $e$. When the lugs $g$ rest in their seats, the cam lever is suspended thereby, its body resting within the slot $e$ and the tail piece projecting into the path of travel of an internal rib $h$ of a collar H, which collar encircles and slides upon the spindle section E, the rib riding in the slot $e$ of the spindle.

I represents a chuck operating rod which is slidably mounted in the front section F of the divided spindle; and J represents a tubular chuck having its front end split to provide the spring clamping jaws $j$. The chuck jaws are closed by their impingement upon the internal tapering walls of the front end of the spindle section F, and by their closing they are made to grip the shank of a tool, as K. The collar H is actuated by means of a sliding sleeve L, which is mounted over the aperture $a$ in the sheath or casing A. This sliding collar has a longitudinal depression $l$, the bottom wall of which is cut away at one point, $l'$. The front or end wall of the depression is under-cut or dove-tailed, as at $l''$. Mounted within the seat formed by this depression is the detent M, shown in Fig. 10, and consisting of a flat plate having its forward end dove-tailed or beveled to correspond with the under-cut or dove-tailed front end wall of the seat, as shown in the side elevation Fig. 10, at $m$, while the rear end of the detent is preferably cut away or notched, as shown at $m'$. On the lower side of this plate M is the lug M' which projects through the aperture $l'$ and engages a groove $h'$ in the collar H. A locking collar N has a threaded engagement with the collar L and engages also the offset $m'$ of the detent M, thus preventing the latter leaving its seat.

The operation of the parts will now be understood.

When the several parts are in the position shown in Fig. 2, the tool K may have its shank entered between the chuck jaws and then to lock the tool the sliding collar will be drawn back, the lug of its detent moving correspondingly and in the same direction the sliding collar H whose lug *h* will engage the tail piece of the cam lever G, thrusting the lower front corner of the latter into engagement with the sliding actuating rod I, which in turn moves the chuck forward within the front section of the spindle, closing the chuck jaws and gripping the tool.

To release the tool, the sleeve is slipped forward, freeing the cam lever and the actuating rod I and chuck J, and as soon as the the pressure upon the latter is relieved the tool may be easily withdrawn.

Many of the features of construction are intended to facilitate and economize manufacture, while the particular construction is such that the various parts may be readily assembled and securely held in position so as to attain certainty of operation and prevent any undue wear or movement of the parts with relation to each other. The principal feature of the invention, however, relates to the manner of locking and releasing the tool. Where the operator desires a hand piece in which the tools can be rapidly changed, the sliding sleeve furnishes the most expeditious and least objectionable form of device for effecting the locking and releasing of the tool; and in my construction the actuating collar and cam lever are mounted upon and rotate with the spindle, while the sliding sleeve is mounted upon the casing and is not rotatable. Furthermore, the sliding sleeve is always maintained in operative position with relation to the sliding collar which acts upon the cam lever so that no matter in what position the collar and cam lever may be they are actuated by the sliding of the external sleeve in its groove. The detent, which forms the connection between the sliding sleeve and the sliding collar, is removable to permit ready assembling of the parts, and the dovetailed connection of the detent with the seat in the sleeve, in conjunction with the locking collar, affords efficient means for retaining the detent in its place during operation and yet permits its ready removal or insertion.

A hand piece constructed as above described has no parts which are subject to much wear; but in order to compensate for any wear that may result, I provide the spindle collet D with the milled head D' so that by screwing the collet D forward in the sheath collet C compensation for wear is secured.

While I have shown the spindle as divided or constructed in two sections, I do not limit my invention thereto, as it is obvious that this feature is structural only and not of the essence of the invention.

I claim—

1. In a dental hand piece, the combination with an outer casing or sheath having a longitudinal working aperture in its wall, a rotatable hollow spindle mounted therein and having a longitudinal slot, an endwise movable chuck within the hollow of the spindle, a cam lever pivotally mounted in the spindle slot and rotatable therewith, a collar sliding on the spindle and having a rib or projection to engage and positively rock the cam lever, and a sliding sleeve mounted on the casing and having a detent movable in the working aperture thereof and adapted to engage and move the sliding collar, substantially as described.

2. In a dental engine hand piece, the combination with a casing, a sliding sleeve mounted thereon, a detent working in a slotted aperture of the casing, a sectional spindle whose front section is hollow and rear section slotted, and the two sections being threaded for engagement with each other, a cam lever pivoted in the slot of the rear section, a sliding chuck and a chuck actuating rod within the hollow of the front spindle section, the heel of the cam being adapted to operate upon the actuating rod, a sliding collar on the spindle, said collar having an internal rib working in the groove or slot thereof and engaging the lever and said collar having a peripheral groove with which the detent of the sliding sleeve engages, substantially as described.

3. In a dental engine hand piece, a lock operating device comprising a sliding sleeve having a removable detent provided with a lug adapted to work through an aperture of the casing, said sleeve having a seat or depression to receive the body of the detent and an aperture to permit the passage of its lug, the front wall of the seat being under-cut or dove-tailed and the front end of the detent being beveled, and a locking collar having threaded engagement with the sliding sleeve and adapted to engage the rear end of the detent to secure it in place, substantially as described.

JOHN D. WILKENS.

Witnesses:
C. C. LINTHICUM,
N. M. BOND.